(12) United States Patent
Oishi

(10) Patent No.: US 10,003,801 B2
(45) Date of Patent: Jun. 19, 2018

(54) IMAGE CAPTURING APPARATUS THAT ENCODES AND METHOD OF CONTROLLING THE SAME

(71) Applicant: CANON KABUSHIKI KAISHA, Tokyo (JP)

(72) Inventor: Akihiro Oishi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/404,629

(22) Filed: Jan. 12, 2017

(65) Prior Publication Data

US 2017/0201749 A1 Jul. 13, 2017

(30) Foreign Application Priority Data

Jan. 13, 2016 (JP) ................................ 2016-004612

(51) Int. Cl.
| | | |
|---|---|---|
| *H04N 19/124* | (2014.01) | |
| *H04N 19/117* | (2014.01) | |
| *H04N 5/335* | (2011.01) | |
| *G06T 5/10* | (2006.01) | |
| *H04N 9/73* | (2006.01) | |

(52) U.S. Cl.
CPC ............ *H04N 19/124* (2014.11); *G06T 5/10* (2013.01); *H04N 5/335* (2013.01); *H04N 9/735* (2013.01); *H04N 19/117* (2014.11); *G06T 2207/20064* (2013.01)

(58) Field of Classification Search
CPC ........ H04N 19/124; H04N 5/335; H04N 5/10; H04N 9/735; G06T 5/10; G06T 2207/20064
USPC .......................................................... 348/222.1
See application file for complete search history.

(56) References Cited

U.S. PATENT DOCUMENTS

| | | | | |
|---|---|---|---|---|
| 6,067,383 A | * | 5/2000 | Taniguchi | G06F 17/14 348/390.1 |
| 6,560,369 B1 | * | 5/2003 | Sato | H04N 19/645 375/E7.047 |
| 6,792,153 B1 | * | 9/2004 | Tsujii | G06T 9/00 382/239 |
| 7,106,909 B2 | * | 9/2006 | Satoh | H04N 19/176 375/E7.13 |

(Continued)

FOREIGN PATENT DOCUMENTS

JP 2003-179926 A 6/2003

*Primary Examiner* — Pritham Prabhakher
(74) *Attorney, Agent, or Firm* — Carter, DeLuca, Farrell & Schmidt LLP

(57) ABSTRACT

An image capturing apparatus has an encoding unit that encodes by generating a plane of each of color components that configure image data, and independently for each of the planes of the color components, performing frequency conversion processing, quantization processing, and entropy encoding, and a control unit that controls the encoding unit. The control unit decide whether or not to correct a quantization coefficient that is used in quantization processing for a plane of each color component obtained by the image sensor based on an ISO sensitivity or exposure information for a time of capturing; and in a case when it decides that a quantization coefficient will be corrected, determines, based on a distribution of a histogram of a plane of each color component, a quantization coefficient used in quantization processing for the respective color component.

13 Claims, 9 Drawing Sheets

(56) References Cited

U.S. PATENT DOCUMENTS

| | | | | |
|---|---|---|---|---|
| 7,142,722 B2* | 11/2006 | Fukuhara | ............ | G06F 17/148 382/240 |
| 7,373,006 B2* | 5/2008 | Fukuzawa | ................. | G06T 5/10 382/232 |
| 8,107,749 B2* | 1/2012 | Birinov | ................ | H04N 19/159 382/236 |
| 8,174,587 B2* | 5/2012 | Fukuhara | ............. | H04N 19/63 348/222.1 |
| 8,358,877 B2* | 1/2013 | Noguchi | ............. | H04N 19/176 382/236 |
| 2002/0064232 A1* | 5/2002 | Fukuhara | ............. | H04N 19/63 375/240.26 |
| 2004/0114821 A1* | 6/2004 | Fukuzawa | ................ | G06T 5/10 382/240 |
| 2008/0266410 A1* | 10/2008 | Fukuhara | ............. | H04N 5/335 348/222.1 |
| 2011/0243470 A1* | 10/2011 | Noguchi | ............. | H04N 19/176 382/239 |
| 2013/0051457 A1* | 2/2013 | Joshi | ................... | H04N 19/147 375/240.03 |
| 2013/0170545 A1* | 7/2013 | Okawa | ................ | H04N 19/176 375/240.04 |
| 2013/0293738 A1* | 11/2013 | Kulkarni | ............... | H04N 19/63 348/222.1 |
| 2014/0105277 A1* | 4/2014 | Bivolarsky | ........... | H04N 19/46 375/240.03 |
| 2014/0105278 A1* | 4/2014 | Bivolarsky | ........... | H04N 19/46 375/240.03 |
| 2015/0130965 A1* | 5/2015 | Oishi | .................. | H04N 19/124 348/223.1 |
| 2016/0173884 A1* | 6/2016 | Le Leannec | ......... | H04N 19/186 382/166 |

\* cited by examiner

F I G. 9

| IMAGE CAPTURING MODE | GAIN INCREASE COMPONENT | CORRECTION COEFFICIENT | | |
|---|---|---|---|---|
| | | $C_R$ | $C_G$ | $C_B$ |
| NORMAL MODE | — | 1 | 1 | 1 |
| EVENING VIEW MODE | R | 0.5 | 1 | 1 |
| LANDSCAPE MODE | B | 1 | 1 | 0.8 |
| ...... | ...... | ...... | ...... | ...... |

IMAGE CAPTURING APPARATUS THAT ENCODES AND METHOD OF CONTROLLING THE SAME

BACKGROUND OF THE INVENTION

Field of the Invention

The present invention relates to an image capturing apparatus, and in particular relates to a technique of handling a RAW image of a still image or a moving image.

Description of the Related Art

Commonly, image capturing apparatuses are equipped with a Bayer array image sensor. Also, an image capturing apparatus performs DeBayer processing (also called demosaic processing) on Bayer array image information (a RAW image) obtained by the image sensor, and converts it into a signal made up of two color differences and a single luminance for a single pixel. Then, the image capturing apparatus performs so-called developing processing such as noise reduction, optical distortion correction, image correction or the like for each signal. Also, the image capturing apparatus uses a compression technique such as JPEG on the luminance signal and the color difference signals on which the developing processing is performed to encode them, and records the result in a recording medium such as a memory card.

Meanwhile, there are image capturing apparatuses that have a function for recording a RAW image without performing DeBayer processing. With a RAW image, there are the advantages that correction and degradation on the original image is suppressed to a minimum and that advanced editing can be performed after capturing, and a RAW image is used preferentially by high level users of image editing.

However, there is a problem in that the data amount becomes large with RAW images. Consequently, the number of pieces of RAW image data that can be stored in a recording medium is small compared to image data for which DeBayer processing/encoding is performed. Therefore, while RAW images are compressed to perform a suppression of their data amount, this introduces image degradation depending on the image capturing conditions. In Japanese Patent Laid-Open No. 2003-179926 (hereinafter referred to as D1), a configuration in which a quantization coefficient is changed in accordance with image capturing conditions in order to suppress image degradation depending on image capturing conditions is recited.

However, in the foregoing D1, if applied to a RAW image for which white balance has not been taken, there is the possibility that the relation between color components depending on the image capturing conditions will become greatly misaligned with the relation between color components in the original RAW image data, and the image quality will degrade.

SUMMARY OF THE INVENTION

The present invention aims to provide a technique capable of generating encoded data from image data efficiently while suppressing image degradation.

According to an aspect of the invention, there is provided an image capturing apparatus having an image sensor, comprising: an encoding unit configured to encode by, from image data obtained from the image sensor, generating a plane of each of color components that configure the image data, and independently for each of the planes of the color components, performing frequency conversion processing, quantization processing, and encoding; and a control unit configured to control the encoding unit, wherein the control unit determines a quantization coefficient used in quantization processing in accordance with image capturing information of a time of capturing the image data.

By virtue of the present invention, it becomes possible to generate encoded data from image data efficiently while suppressing image degradation.

Further features of the present invention will become apparent from the following description of exemplary embodiments (with reference to the attached drawings).

BRIEF DESCRIPTION OF THE DRAWINGS

FIG. 9 illustrates a figure for describing a table according to a third embodiment.

DESCRIPTION OF THE EMBODIMENTS

Hereinafter, embodiments according to the present invention will be described in detail in accordance with the accompanying drawings.

Figure 1:
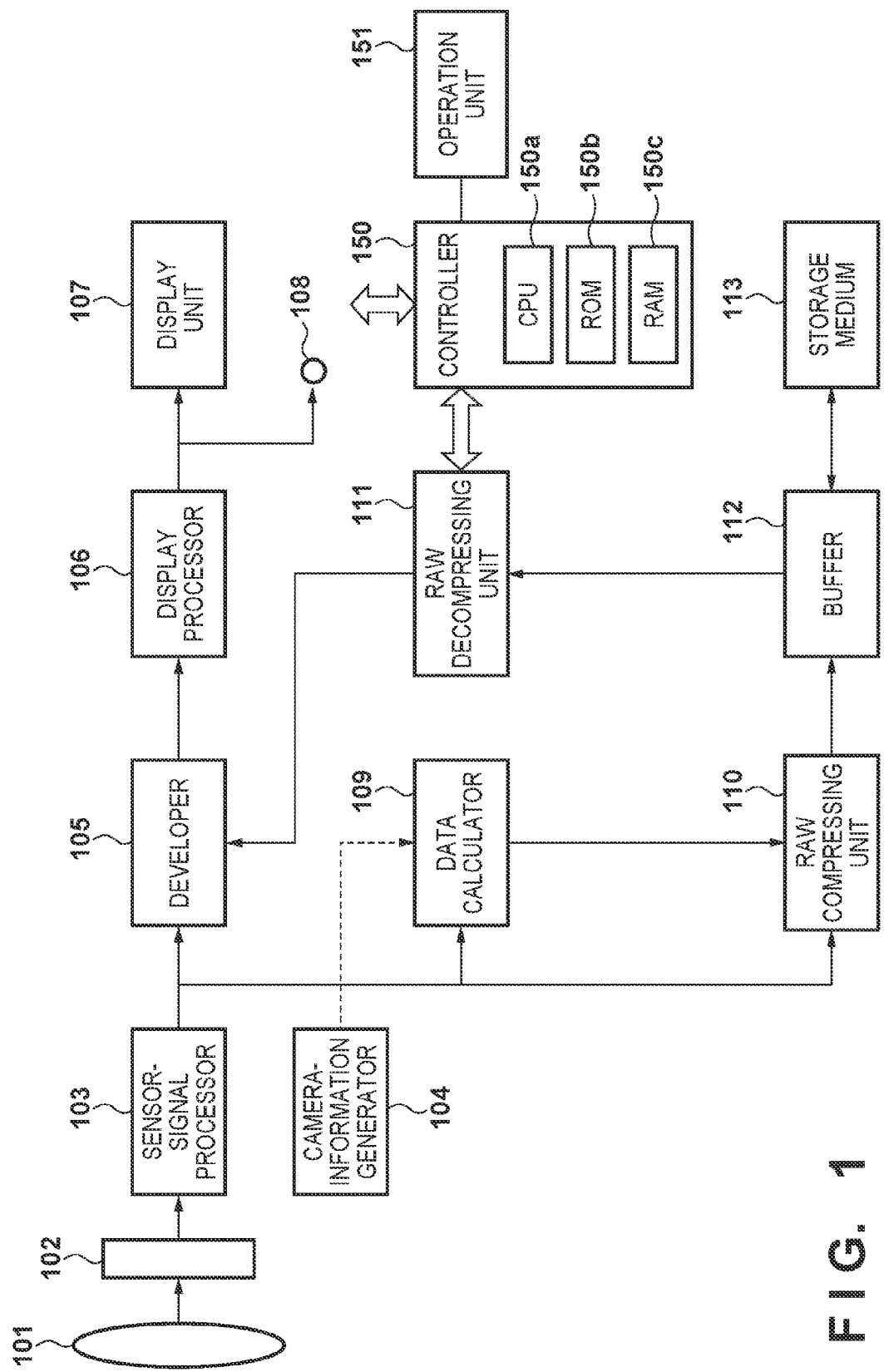
FIG. 1 is a block configuration diagram of an image capturing apparatus according to an embodiment.

FIG. 1 is a block diagram for describing an example of a configuration of an image capturing device 100 according to embodiments of the present invention. In FIG. 1, a controller 150 is a unit that is responsible for controlling the apparatus overall, and includes a CPU 150a, a ROM 150b in which a program that the CPU executes and various tables are stored, and also a RAM 150c which is used as a work area. The controller 150 is connected to an operation unit 151 which receives instruction input from a user.

In the illustrated configuration, if a user inputs an image capturing instruction via the operation unit 151, under the control of the controller 150, an optical image of a subject as an imaging target is inputted via an image capturing optical unit 101, and an image is formed on an image sensor unit 102. The image sensor unit 102 converts light transmitted through red, green and blue (RGB) color filters arranged for each pixel in accordance with a set gain into an electrical signal.

Figure 2:
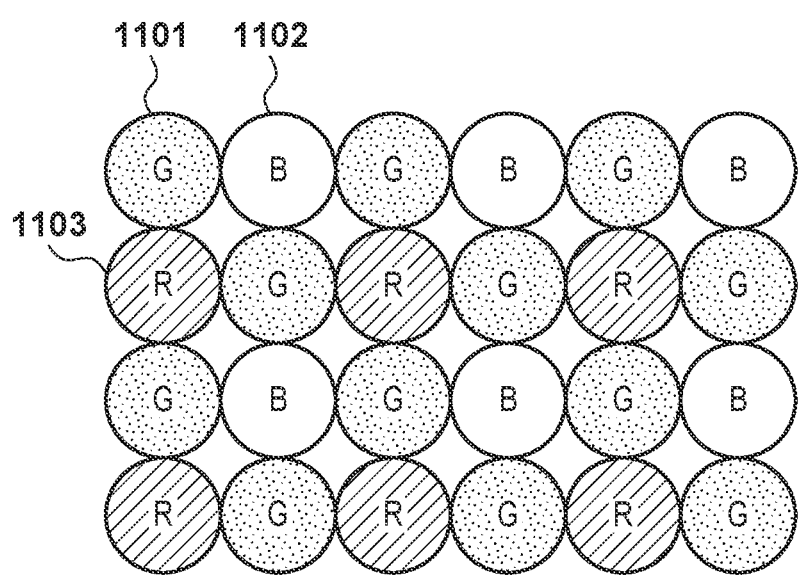
FIG. 2 illustrates a figure for describing a Bayer array.

FIG. 2 is an example of a color filter arranged in the image sensor unit 102, and represents a pixel array of an image that the image capturing device 100 handles. As illustrated in FIG. 2, a pixel 1103 which is red (R), a pixel 1101 which is green (G), and a pixel 1102 which is blue (B) are arranged in a mosaic form. Here, the structure is such that for 2×2=4 pixels in the arrangement, one red pixel, one blue pixel, and two green pixels are made to be a set, which is arranged regularly. Such a color component pixel arrangement is called a Bayer array generally.

An electrical signal converted by the image sensor unit 102 is supplied to a sensor-signal processor 103. The sensor-signal processor 103 converts into digital data from the electrical signal from the image sensor unit 102, and applies pixel restoration processing. In the restoration processing, processing for using a peripheral pixel value for a value of a pixel to be restored such as a missing pixel or one whose reliability is low in the image sensor unit 102 in interpolation and subtraction of a predetermined offset value is included. In the present embodiment, image data outputted from the sensor-signal processor 103 is called RAW image data, which means an image that is raw (not developed).

The RAW image data is supplied to a developer 105. The developer 105 applies DeBayer processing (demosaic processing) to the RAW image data, performs white balance control, and converts each pixel into image data made up of one luminance and two color differences. Also, the developer 105 performs so-called developing processing such as correction by removing noise included in the image data or correcting an optical distortion.

The image data for which the developing processing is performed by the developer 105 is supplied to a display processor 106. The display processor 106 converts into RGB image data from the luminance and color difference image data and supplies the result to a display unit 107. The display unit 107 receives the image data and displays an image as a visual image. The display unit 107 is assumed to be, for example, a liquid crystal display unit, and the type of its display elements is not limited. Also, the image data for which the developing processing is performed may be outputted to a display device connected externally by a video output terminal 108. The video output terminal 108 includes a general purpose interface such as, for example, HDMI (registered trademark), SDI or the like.

The RAW image data is also supplied to a data calculator 109 and a RAW compressing unit 110. The data calculator 109 analyzes and calculates RAW image data based on camera information inputted from a camera-information generator 104, and calculates parameters necessary for compression processing of the RAW compressing unit 110. Then the calculator 109 supplies the parameter to the RAW compressing unit 110. The camera-information generator 104 generates and supplies, as camera information, exposure information, which indicates whether or not there is a proper exposure condition according to AE processing, and also sensitivity information, which indicates a current ISO sensitivity.

The RAW compressing unit 110, based on the parameter inputted from the calculator 109, extracts (or separates) each color component plane (one R component, one B component, and two G components) that configure the RAW image data inputted from the sensor-signal processor 103, and independently for each plane performs high-efficiency encoding using a technique such as a wavelet transform (one frequency conversion), differential encoding, or the like, to convert into a RAW file of a compressed state. Then, the RAW compressing unit 110 stores the RAW file obtained by conversion in a buffer 112. When it is stored in the buffer 112, the controller 150 performs processing for writing the RAW file to a storage medium 113. At this time, the controller 150 performs processing to include information necessary for decoding in a header of the RAW file. The storage medium 113 is a built-in large capacity memory, a hard disk, or a memory card of an attachable/detachable type or the like.

Also, if a playback instruction is inputted via the operation unit 151 from a user, the controller 150 stores in the buffer 112 the RAW file that the user designated from the storage medium 113. Then, a RAW decompressing unit 111 reads the RAW file stored in the buffer 112, and generates RAW image data by performing decoding processing on the compressed state RAW file. The RAW image data obtained by the RAW decompressing unit 111 is supplied to the developer 105. After this, the display processor 106 performs a display (playback) by converting into RGB image data from the image data for which the developing processing is performed by the developer 105 and supplying the result to the display unit 107.

The RAW compressing unit 110 in embodiments is of a configuration in which it is possible to perform not just lossless encoding but also lossy encoding in order to be able to record more images in the storage medium 113. In lossy encoding processing, wavelet transform processing is used. The RAW compressing unit 110 generates a plurality of sub-bands by wavelet transform processing on the RAW image data. The RAW compressing unit 110 performs quantization with respect to a wavelet coefficient that configures each sub-band, and thereafter, performs lossy encoding by performing entropy encoding.

Here, image capturing conditions are normal, and there is no problem in encoding using a quantization coefficient determined in advance. However, in the case of certain specific image capturing conditions, when the foregoing quantization coefficient is used to perform quantization, the quantization error becomes so large that it cannot be ignored, and image degradation is introduced. Hereinafter, processing for solving the corresponding problem will be described.

The RAW image data, as illustrated in previously described FIG. 2, is Bayer arrangement image data, 2×2=4 pixels are configured as one red pixel, one blue pixel, and two green pixels, and the structure is such that this set of 2×2 pixels is periodically arranged.

The number of pixels of the green (G) component is twice the number of pixels of the other color components, and the green on the same line as the red (R) is made to be G1, and the green on the same line as the blue (B) is made to be G2 to distinguish representation thereof. In the case where G is recited without such notation, it indicates G1. Also, hereinafter the image configured by only the G1 component, the image configured by only the G2 component, the image configured by only the R component, and the image configured only by the B component are each referred to as a plane.

Figure 3A:
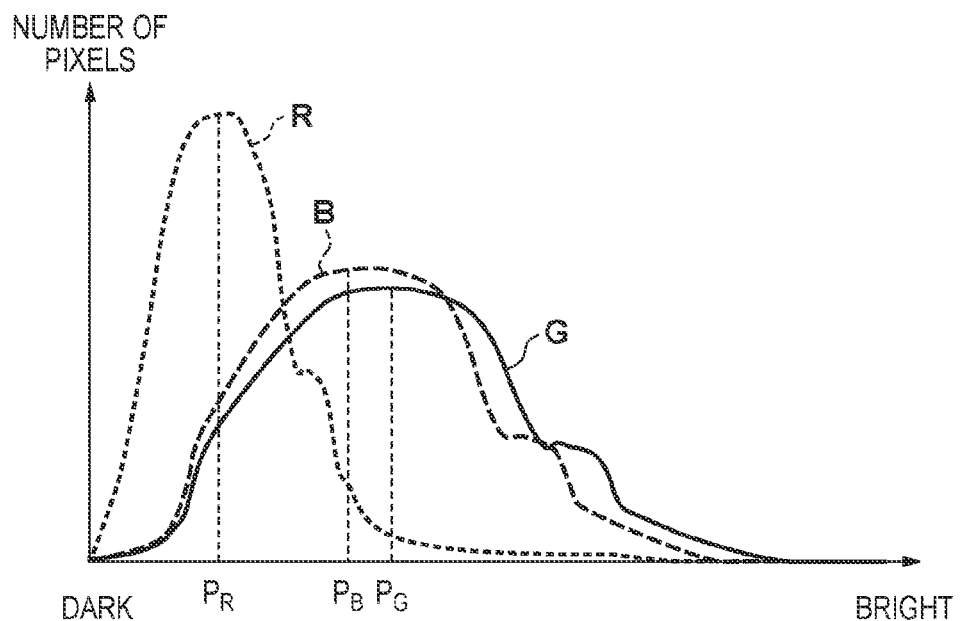
FIGS. 3A and 3B are histograms of each color component of RAW image data in an embodiment.

FIG. 3A illustrates histograms of an R plane, a B plane, and a G (G1) plane in RAW image data of a particular frame. The horizontal axis is the pixel value (the luminance value), and the vertical axis is the number of pixels.

When a wavelet transform is executed one time with respect to the RAW image data, sub-bands LL, HL, LH, and HH are generated in relation to one color component. Here, the sub-band HH of each color component is represented by $HH_R$, $HH_G$, and $HH_B$. When a transform coefficient in a sub-band is represented hypothetically by 8 bits, the range that it can take is 0 through 255.

In the sub-band $HH_R$ of the R component, the number of transform coefficients (accumulated number) in the range where the value is 0 to i is represented as $N_R(i)$. Similarly, in the sub-band $HH_G$ of the G component, the number of transform coefficients in the range where the value is 0 to i is represented as $N_G(i)$. Also, in the sub-band $HH_B$ of the B component, the number in the range where the value is 0 to i is represented as $N_B(i)$.

Note that $N_R(255)$ represents the number of transform coefficients of the values 0 to 255 in the sub-band $HH_R$, and is the same as the number of all transform coefficients in the sub-band $HH_R$. Similarly, $N_B(255)$ is the same as the number of all transform coefficients in the sub-band $HH_B$, and $N_G(255)$ is the same as the number of all transform coefficients in the sub-band $HH_G$.

Figure 4:
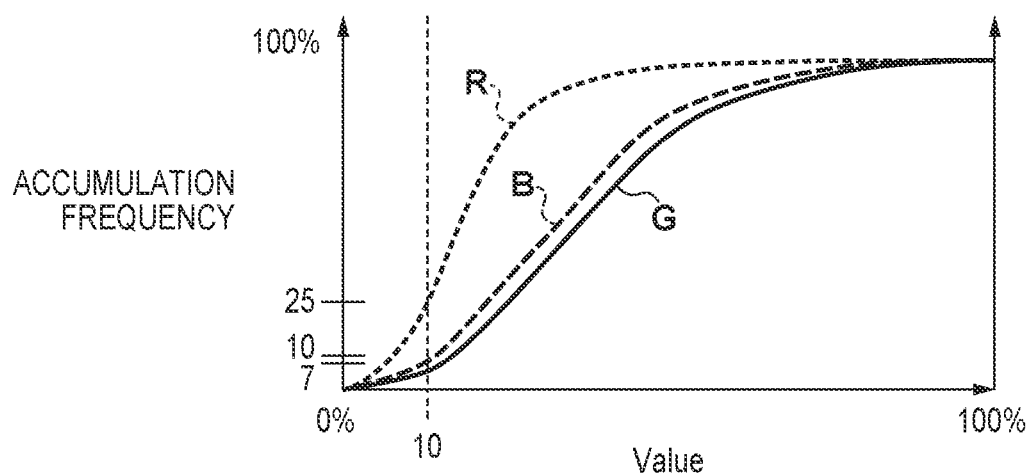
FIG. 4 is an example of an accumulating frequency of each color component of a sub-band HH of a wavelet transform.

In the case where the value of the transform coefficient is made to be the horizontal axis and the vertical axis is made to be the accumulated number, the curve is approximately as in FIG. 4. As is illustrated, for R component transform coefficients, the transform coefficient accumulation number becomes 100% at a relatively early stage as compared to the G and B components. This illustrates that most of the transform coefficients in the sub-band $HH_R$ of the R component are small values.

Prior to performing entropy encoding, quantization processing is performed. It is assumed that the standard quantization coefficient (hereinafter referred to as standard quantization coefficient $Q_S$) used in this quantization is hypothetically 25 ($\approx$255/10) which corresponds to 10% of the maximum value of a transform coefficient. In the case of FIG. 4, the transform coefficients of 10% of all transform coefficients in the sub-band $HH_B$ are quantized to 0, and the transform coefficients of 7% of all transform coefficients in the sub-band $HH_G$ are quantized to 0. In contrast to this, the transform coefficients of 25% of all transform coefficients in the sub-band $HH_R$ are quantized to 0.

By a combination of R, G, and B, and the color is determined for one pixel. However, as is illustrated, when a transform coefficient quantization result of one component is greatly different to the transform coefficient quantization result of a component, the distribution of color of the original is broken, resulting in bad image quality in the image obtained by decoding. Also, if actually displaying, white balance adjustment processing is performed for R, G, and B data, but since many R components become 0 as described above, the white balance control does not function correctly. In other words, the tone of the image becomes misaligned with respect to the original image, which means that there was no point to saving it as RAW image data.

The foregoing problem can be avoided by making a quantization coefficient $Q_R$ used in relation to an R component transform coefficient smaller than the standard quantization coefficient $Q_S$. Accordingly, the inventors of the present application came to an idea to solve the problem in the following way.

As illustrated in FIG. 4, the distribution of each color component of the transform coefficients in the wavelet transform result can be estimated from a histogram of each color component illustrated in FIG. 3A. Accordingly, the peak positions $P_R$, $P_G$, and $P_B$ of the histograms of the R, G, and B components of FIG. 3A are obtained. Then, it is decided whether or not the differences of these three component peak positions are within a tolerance range. Specifically, if all of the following formulas (1) through (3) which use a pre-set threshold value Th are satisfied, the three component peak positions are treated as being within the tolerance range of each other.

$$|P_R-P_G| \leq Th \quad (1)$$

$$|P_G-P_B| \leq Th \quad (2)$$

$$|P_B-P_R| \leq Th \quad (3)$$

If at least one of the above three formulas is not satisfied, it represents that one or two of the peak positions in of the three components is smaller (darker) than the other color component peak positions. Then, if the peak position decided to be the smallest is less than or equal to the threshold value set in advance for deciding darkness, the quantization coefficient of a color component having the peak position that is less than or equal to the threshold value for deciding darkness is made to be the target of correction.

For example, it is assumed that in FIG. 3A, the difference between the peak positions $P_G$ and $P_B$ is less than or equal to the threshold value Th, and the difference between the peak positions $P_R$ and $P_B$ exceeds the threshold value Th, and the peak position $P_R$ is less than or equal to the darkness threshold value.

In the present embodiment, the ratio of the peak position of the R component which is the focus peak position with respect to the average peak position of the G and B components is calculated as a correction coefficient $C_R$.

$$C_R = P_R / \{(P_B + P_G)/2\}$$

Then the quantization coefficient $Q_R$ used when quantizing the R component is calculated in accordance with the following formula.

$$Q_R = Q_S \times C_R$$

The standard quantization coefficient $Q_S$ is used for the quantization coefficients of the B and G components.

The result of the foregoing is that the quantization coefficient $Q_R$ used when quantizing the R component becomes smaller than the quantization coefficients $Q_B$ and $Q_G$ of the other color components, and it is possible to solve the problem of color balance described previously.

Here, unlike FIG. 3A, it is assumed that the difference between the peak positions $P_R$ and $P_G$ hypothetically is less than or equal to the threshold value, and these are smaller than the peak position $P_B$ and the distance between the peak position $P_B$ and one of the peak positions $P_R$ and $P_G$ exceeds the threshold value Th. Also, the peak positions $P_R$ and PG are made to be smaller than or equal to the preset threshold value for deciding darkness. In such a case, the correction coefficients $C_R$ and $C_G$ of the color components R and G are as follows:

$$C_R = P_R / P_B$$

$$C_G = P_G / P_B$$

Then, the quantization coefficient of each color component is given by the following formulas:

$$Q_R = Q_S \times C_R$$

$$Q_G = Q_S \times C_G$$

$$Q_B = Q_S$$

To repeat the description given before, a G component described thus far is the G1 component. The histograms of G1 and G2 are treated to be the same as each other. Accordingly, in a case when the quantization coefficient $Q_G$ is determined as described above, please note that it is applied to both the G1 plane and the G2 plane.

In the embodiment, the processing for correcting the quantization coefficient described above is not performed on all captured images unconditionally, and rather it is determined whether or not the processing for correcting the quantization coefficient is performed depending on an image capturing condition. Specifically, the foregoing processing for correcting the quantization coefficient is performed in a case when an exposure upon capturing is outside of a proper exposure range, or in a case when the exposure is in the proper range and an ISO sensitivity is above a predetermined value.

Figure 5:
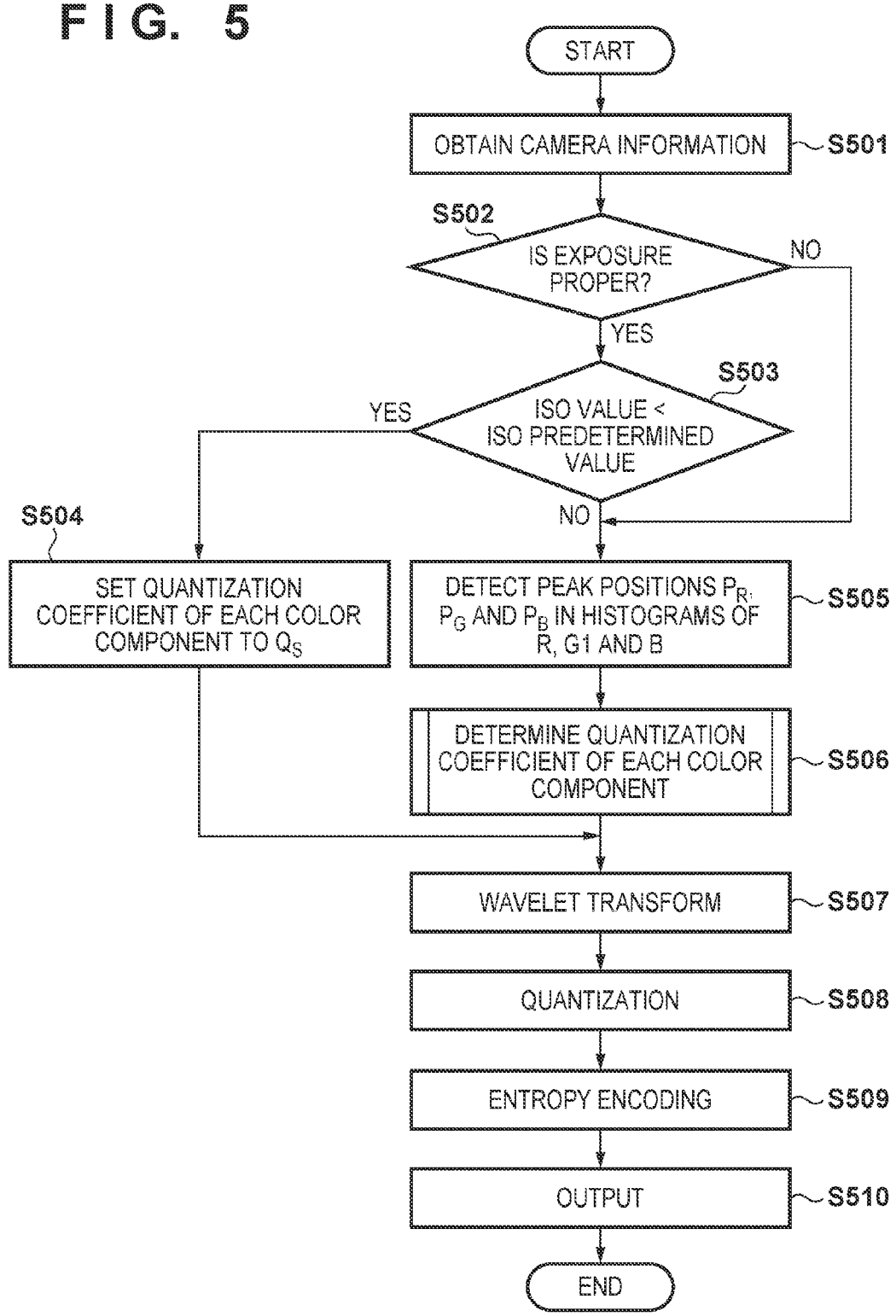
FIG. 5 is a flowchart for describing an encoding processing procedure in a first embodiment.

Hereinafter, processing of the controller 150 of the image capturing apparatus in the embodiment is described in accordance with a flowchart in FIG. 5. Note that processing according to this figure is processing in a case when a user performs capturing by operating the operation unit 151 to input a capturing instruction.

Firstly, the controller 150 obtains camera information generated by the camera-information generator 104 in step S501. Information as to whether or not the exposure by an AE function upon capturing is proper, and ISO sensitivity information are included in the camera information.

The controller 150, in step S502, decides, based on the obtained camera information, whether or not the exposure upon capturing is in the proper range. If it is not, the processing is advanced to step S505. Also, in a case when it is decided that the exposure upon capturing is proper, the process is advanced to step S503.

The controller 150, in step S503, decides whether or not the ISO sensitivity upon capturing is less than a preset ISO predetermined value. In a case when the ISO sensitivity upon capturing is less than the ISO predetermined value, the subject may be considered to be captured under a sufficient amount of light, so the processing is advanced to step S504. Then, the controller 150 sets quantization coefficient of each plane R, G1, G2, and B to the standard quantization coefficient $Q_S$ in step S504.

On the other hand, in a case when it is determined that the ISO sensitivity upon capturing is greater than or equal to the ISO predetermined value in step S503, it means that a dark subject is being captured or the sensitivity is increased intentionally. Consequently, the controller 150 controls the data calculator 109 to cause processing for determining the quantization coefficient of each color component to be executed via the processing of step S505 and step S506.

Firstly, in step S505, the data calculator 109 obtains the RAW image data from the sensor-signal processor 103 and detects the peak positions $P_R$, $P_G$, and $P_B$ of each color component from the histograms for R, G (G1), and B.

Then, in step S506, using Equations (1) through (3) described previously, it is decided whether or not the differences between each of the peak positions of the color components are less than or equal to the threshold value Th. If below the threshold value, the quantization coefficient of the respective color component is set to the standard quantization coefficient $Q_S$. On the other hand, if any one of Equations (1) through (3) is not satisfied, correction of the quantization coefficients of one or two of the color components that have a peak position on the dark side out of the three color components is made as described previously.

As a result of the above, the quantization coefficients of the color components R, G (G1 and G2), and B are determined, and therefore the controller 150 sets the determined quantization coefficient of each color component to the RAW compressing unit 110, and causes it to perform encoding of each plane that configures the RAW image data.

Specifically, the RAW compressing unit 110, in step S507, performs a wavelet transform for each of the R, G1, G2, and B planes. Then the RAW compressing unit 110 quantizes the transform coefficients in the sub-bands obtained by the wavelet transform of each plane by the foregoing determined quantization coefficients in step S508. Then, the RAW compressing unit 110, in step S509, for each color component, performs entropy encoding of the transform coefficients of the sub-bands after quantization, and outputs the obtained encoded data to the buffer 112. The controller 150, in step S510, adds to the encoded data stored in the buffer 112, as a file header, information necessary for decoding and performs processing for saving to the storage medium 113.

Figure 7:
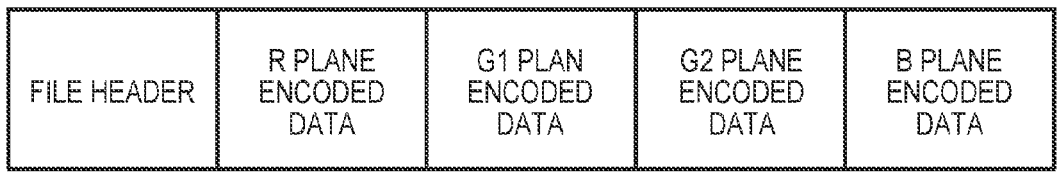
FIG. 7 illustrates a figure for describing a data structure of an encoded data file in an embodiment.

The encoded data file saved in the storage medium 113 is of the structure in FIG. 7 for example. In the file header, information which specifies the sizes of horizontal and vertical directions of the image data, the number of executions of a wavelet transform, a number of bits for each pixel, and a quantization coefficient of each color component plane is included.

As described above, the is a high possibility that the distribution of each color component will be misaligned more than usual in a case when it is not a proper exposure at a time of capturing or in a case when capturing at an ISO sensitivity higher than an ISO reference value even if there is a proper exposure. At a time of a corresponding capturing situation, it becomes possible to suppress the color balance of the image when decoded from becoming unnatural by correcting the quantization coefficients of the color components as described above. In other words, generation of encoded data which suppresses image degradation becomes possible.

Second Embodiment

Figure 6:
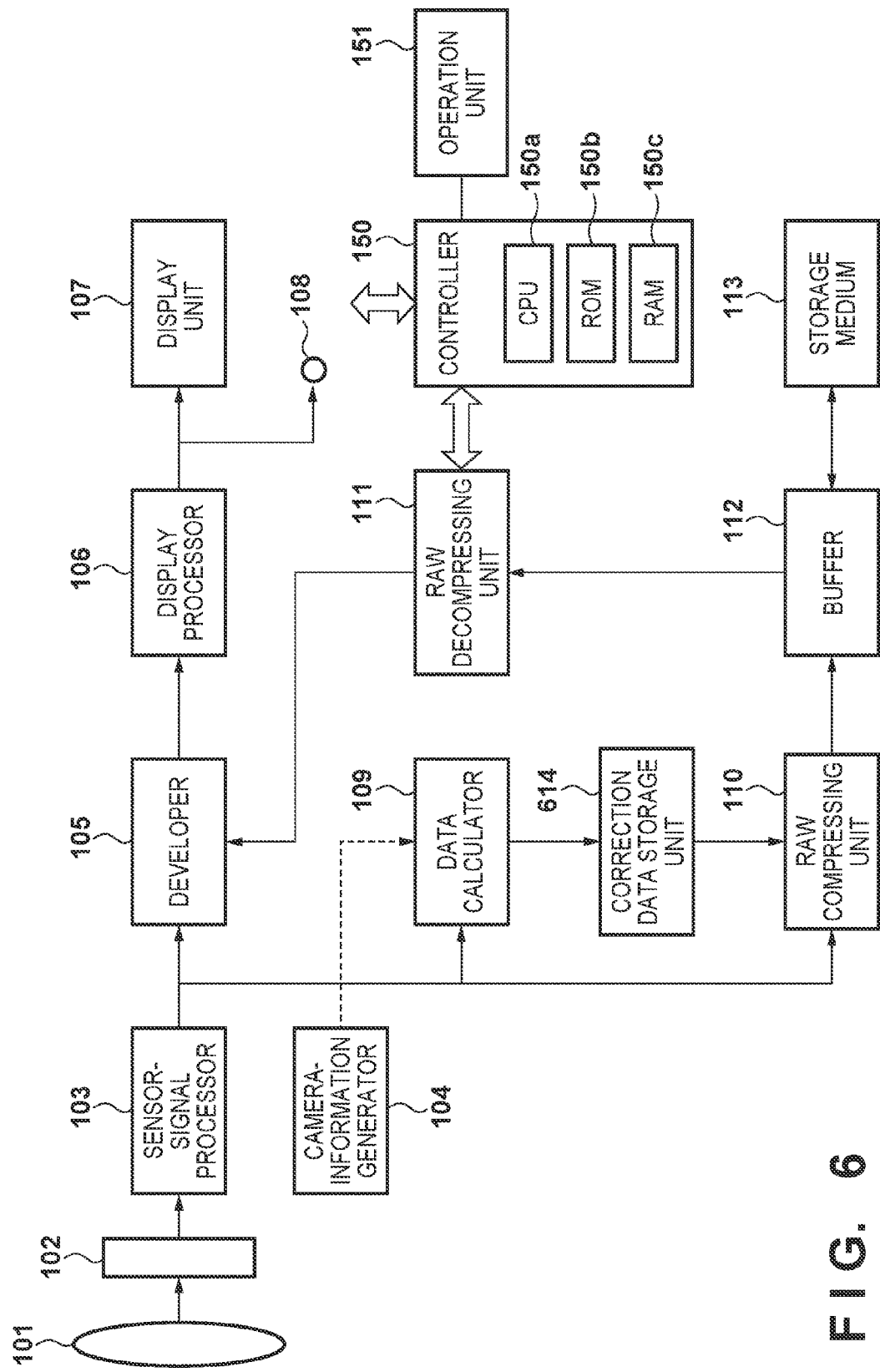
FIG. 6 is a block configuration diagram of an image capturing apparatus according to a second embodiment.

FIG. 6 is a block diagram for describing an example of a configuration of an image capturing apparatus according to a second embodiment. The difference between FIG. 6 and FIG. 1 is that a correction data storage unit 614 is added, and everything else is the same as in the first embodiment. Also, because the overall processing is the same as in the first embodiment description thereof is omitted. The present second embodiment is ideal for moving image capturing or continuous shooting capturing.

A degree of correlation across screens along a time axis is high when images are captured in a relatively short time interval such as moving image or continuous shooting. Accordingly, if a time interval is within a predetermined amount of time of a picture for which a correction value is determined, a quantization correction value is stored in the correction data storage unit 614.

For example, a quantization coefficient of each color component is stored in the correction data storage unit 614 when one initial image is captured in a case of continuous shooting capturing. Then, a quantization coefficient after correction stored in the correction data storage unit 614 is used to quantize subsequent images to a final image, and then these are encoded.

Also, in a case of a moving image being captured at 30 frames/second, processing for correcting the quantization coefficient in a 2 second interval (configuration may also be taken such that this interval can be set by a user), for example, is performed, quantization coefficients obtained by immediately preceding correction processing is used to quantize images captured in this interval, and then encoding is performed. Note, in the case of a moving image, there exists cases in which a scene change occurs, and the processing for correcting the quantization coefficient is performed at this timing and the correction data storage unit 614 is updated in a case when a corresponding scene change occurs.

The result of the above is that it becomes unnecessary to perform the processing for correcting the quantization coefficient for each single image, in the case of a moving image or continuous shooting, the processing load can be reduced, and for this reason a reduction in power consumption can be expected.

Third Embodiment

In image capturing apparatuses as typified by digital cameras in recent years, it has become possible to select various image capturing modes. For example, in an evening view mode, processing for increasing a gain of a red component is performed in order to enhance the red component. Also, in a day view mode in which a blue sky at a time of daylight is inputted, processing for increasing a gain of a blue component is performed in order to enhance the blue sky.

Figure 3B:
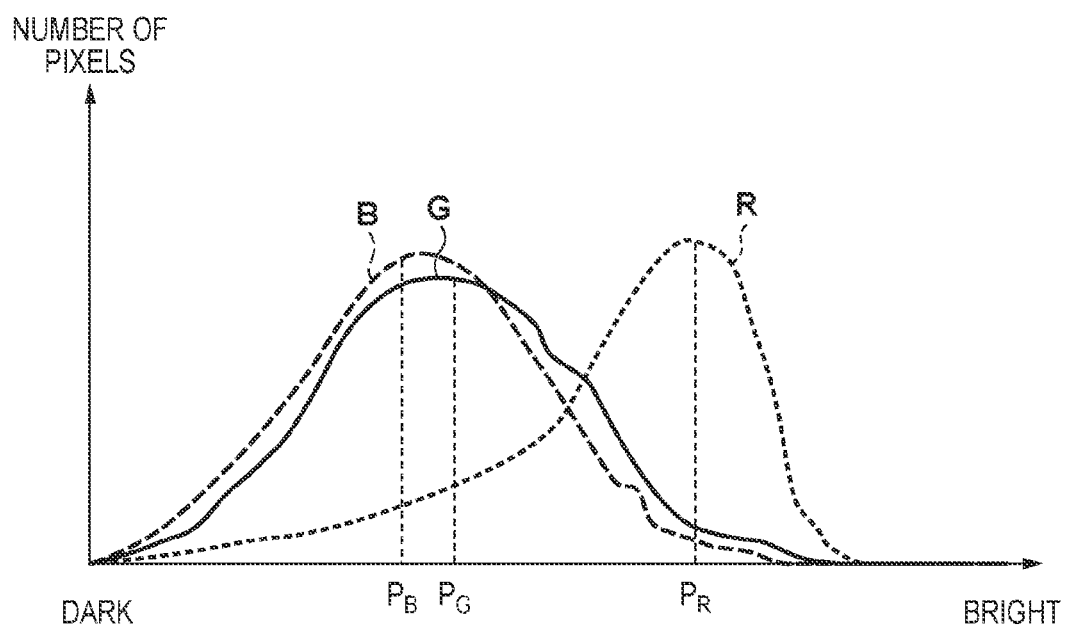

Here, in an image captured in the evening view mode, the number of pixels of a high luminance side of the R component becomes greater, and there is a strong tendency for the histograms of the planes of each color component to become as in FIG. 3B for example. However, it becomes difficult to maintain a distribution of the high luminance side of the R component with high precision in a case when wavelet transformation coefficients of each color component of an image are quantized by the standard quantization coefficient as illustrated. In the evening view mode, recording as RAW image data is also something that a user desires when wanting to save an R component with high precision. For this reason, in the present third embodiment, configuration is taken so that an image of a high precision for the R component can be played back by quantizing the R component by finer values than another component in a case when a user selects the evening view mode as the image capturing mode via the operation unit 151.

The foregoing is the same for the day view mode. In the day view mode, a value smaller than the standard quantization coefficient $Q_S$ is used as the quantization coefficient $Q_B$ of the B component.

For the above, in the present third embodiment, a table illustrated in FIG. 9 is stored in the ROM 150b within the controller 150. As illustrated, in the table, each field of an image capturing mode, a gain increase color component, and the correction coefficients $C_R$, $C_G$, and $C_B$ of each color component are associated.

The correction coefficient is described in the first embodiment previously described. In other words, relations of the correction coefficients $C_R$, $C_G$, and $C_B$, the standard quantization coefficient $Q_S$, and the quantization coefficients $Q_R$, $Q_G$, and $Q_B$ of each color component are as in the following formulas (4) through (6).

$$Q_R = Q_S \times C_R \quad (4)$$

$$Q_G = Q_S \times C_G \quad (5)$$

$$Q_B = Q_S \times C_B \quad (6)$$

For example, the gain of the R component is increased in a case when the user selects the "evening view mode" as the image capturing mode. Also, the quantization coefficient which is used when the wavelet transformation coefficients of each color are quantized can be acquired by the following formulas because the correction coefficients of each color component of R, G, and B are 0.5, 1, and 1.

$$Q_R = Q_S/2$$

$$Q_G = Q_S$$

$$Q_B = Q_S$$

As a result, a quantization coefficient of the R component becomes smaller than a quantization coefficient of another color component and it is possible to encode while maintaining high precision for the R component.

Figure 8:
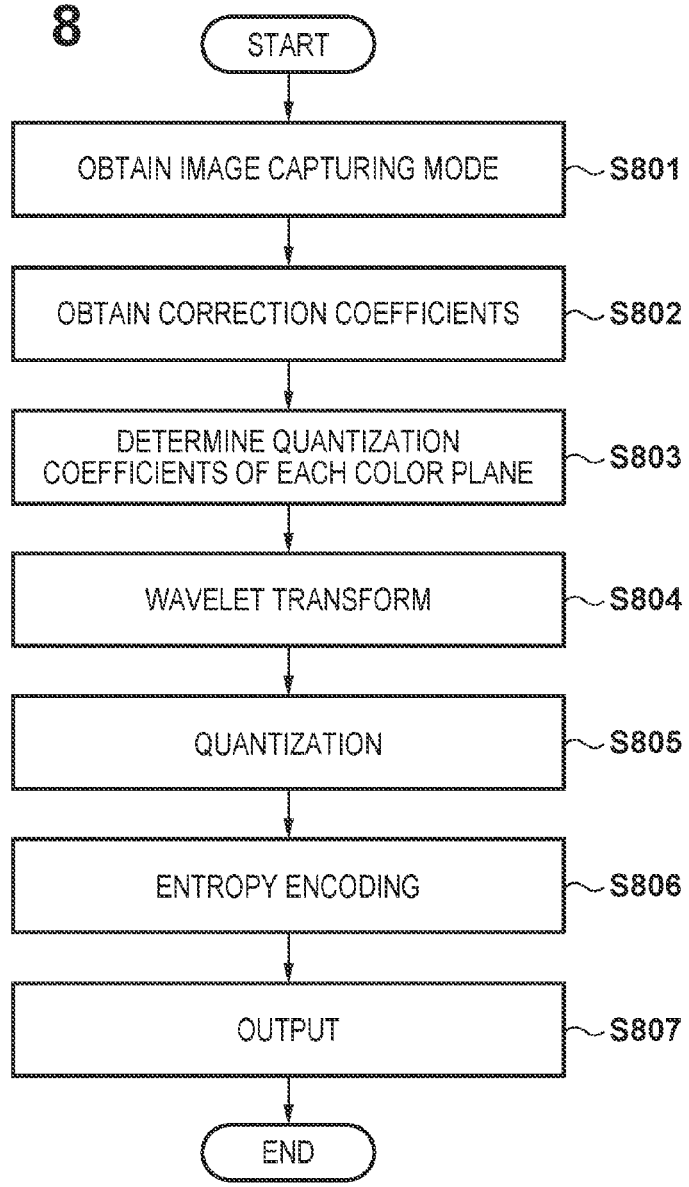
FIG. 8 is a flowchart for describing an encoding processing procedure in a third embodiment.

Hereinafter, a processing procedure of the controller 150 in the third embodiment is described in accordance with a flowchart in FIG. 8. Note that processing according to this figure is processing in a case when a user performs capturing by operating the operation unit 151 to input a capturing instruction. Also, the gain adjustment in the image capturing mode is assumed to be already set in the image sensor unit 102 by the controller 150.

Firstly, the controller 150, in step S801, obtains the current image capturing mode set by the operation unit 151. Then, the controller 150, in step S802, using the obtained image capturing mode as a key, obtains the correction coefficients $C_R$, $C_G$, and $C_B$ of each color component by referencing the table of FIG. 9. Then, in step S803, the controller 150 calculates the quantization coefficient of each color component by multiplying the correction coefficient of each color component by the standard quantization coefficient $Q_S$ as shown in Equation (4) through (6). As a matter of course, the obtained quantization coefficient $Q_G$ is applied to the planes of both G1 and G2.

Next, in step S804 through step 806, the controller 150 sets the determined quantization coefficients in the RAW compressing unit 110 and causes an encoding of the RAW image data to be performed.

Specifically, the RAW compressing unit 110, in step S804, performs a wavelet transform for each of the R, G1, G2, and B planes. Then the RAW compressing unit 110 quantizes the transform coefficients in the sub-bands obtained by the wavelet transform of each plane by the foregoing determined quantization coefficients in step S805. Then, the RAW image compressing unit 110, in step S806, for each color component, performs entropy encoding of the transform coefficients of the sub-bands after quantization, and outputs the obtained encoded data to the buffer 112.

The controller 150, in step S807, adds to the encoded data stored in the buffer 112, as a file header, information necessary for decoding and performs processing for saving to the storage medium 113.

By virtue of the foregoing present third embodiment, the quantization coefficient of only a color component viewed as important in an image capturing mode that the user set is made smaller than the standard quantization coefficient. As a result, it becomes possible to obtain encoded data for reproducing a color component that is special in the mode with a high precision without the data amount increasing unnecessarily.

Fourth Embodiment

Figure 10:
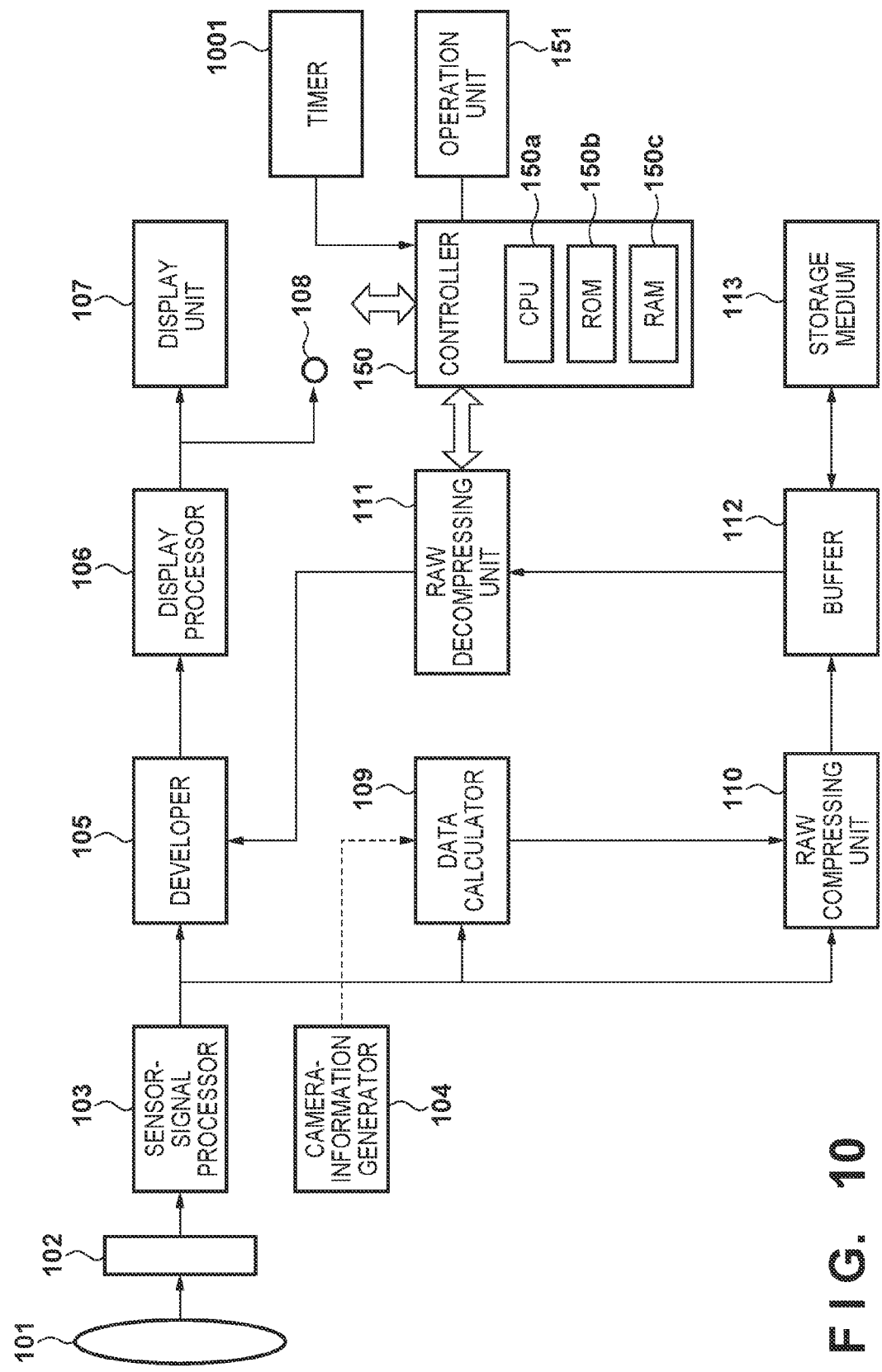
FIG. 10 is a block configuration diagram of an image capturing apparatus in a fourth embodiment.

While in the foregoing third embodiment, it is assumed that the user sets the image capturing mode via the operation unit 151, a user may be allowed to select whether or not to cause automation. Accordingly, a timer 1001 which measures the current date and time is comprised as illustrated in FIG. 10. The difference with FIG. 1 is that there is the timer 1001 and therefore description of everything other than the timer 1001 is omitted.

For example, the controller 150 decides the evening view mode or the day view mode in a case when automation is set. For example, the evening view mode may be set in a case when a season and the current time according to the timer 1001 is a time period which represents the evening, and from the image sensor, a red having an intensity greater than or equal to the pre-set threshold value is detected. Also, the day view mode may be decided in a case when the amount of light is sufficient and the current time is in a time period that defines daytime, and the distance from a subject is sufficiently large.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004612, filed Jan. 13, 2016, which is hereby incorporated by reference herein in its entirety.

What is claimed is:

1. An image capturing apparatus having an image sensor, comprising:
   one or more processors; and
   at least one memory coupled to the one or more processors, the at least one memory having instructions stored thereon which, when executed by the one or more processors, cause the image capturing apparatus to:
      encode by, from image data obtained from the image sensor, generating a plane of each of color components that configure the image data, and independently for each of the planes of the color components, performing frequency conversion processing, quantization processing, and encoding, and
      determine a quantization coefficient used in quantization processing in accordance with image capturing information of a time of capturing the image data, the determining including:
         deciding whether or not to correct a quantization coefficient that is used in quantization processing for a plane of each color component obtained by the image sensor based on an ISO sensitivity or exposure information for a time of capturing; and
         in a case when it is decided that a quantization coefficient will be corrected, determine, based on a distribution of a histogram of a plane of each color component, a quantization coefficient used in quantization processing for the respective color component.

2. The image capturing apparatus according to claim 1, wherein the instructions, when executed by the one or more processors, further cause the image capturing apparatus, in the deciding, to decide to correct the quantization coefficient when either of:
   (1) an exposure that exposure information indicates is outside a tolerance range, or
   (2) the exposure is within the tolerance range and a sensitivity of a time of capturing is greater than or equal to a predetermined threshold value,
   is satisfied.

3. The image capturing apparatus according to claim 1, wherein the instructions, when executed by the one or more processors, further cause the image capturing apparatus, in the determining, to:
   detect three peak positions that represent color components from a histogram of each of R, G, and B component planes; and
   when a peak position whose luminance is lowest among the three peak positions, and whose distance from a peak of another color component is separated by greater than or equal to a threshold value set in advance is made to be a focus peak position, set a quantization coefficient of a color component that the focus peak position indicates by multiplying a ratio of the focus peak position and a peak position of the other color component by a standard quantization coefficient set in advance, and set the other color component to use the standard quantization coefficient.

4. The image capturing apparatus according to claim 1, wherein the instructions, when executed by the one or more processors, further cause the image capturing apparatus, in the encoding, to:
   perform a wavelet transform of a plane of a color component that is focused on;
   quantize, by using a quantization coefficient set in the determining, a transform coefficient of a sub-band obtained by conversion; and
   entropy encode an after quantization transform coefficient.

5. The image capturing apparatus according to claim 1, wherein
   the image sensor is a Bayer array image sensor, and
   the planes that are targets of the encoding are four planes of R, G1, G2, and B that configure RAW image data obtained from the image sensor.

6. An image capturing apparatus having an image sensor, comprising:
   a storage configured to store, in association, a type of image capturing mode and information for determining a quantization coefficient of each color component;
   one or more processors; and
   at least one memory coupled to the one or more processors, the at least one memory having instructions stored thereon which, when executed by the one or more processors, cause the image capturing apparatus to:
      encode by, from image data obtained from the image sensor, generating a plane of each of color components that configure the image data, and independently for each of the planes of the color components, performing frequency conversion processing, quantization processing, and encoding, and determine a quantization coefficient used in quantization processing in accordance with image capturing information of a time of capturing the image data, the determining including, based on an image capturing mode at a time of capturing by the image sensor, determining a quantization coefficient used in quantization processing of every color component with reference to the storage.

7. The image capturing apparatus according to claim 6, wherein the storage stores a correction coefficient of each color component in association with a type of image capturing mode; and wherein the instructions, when executed by the one or more processors, further cause the image capturing apparatus, in the determining, to: determine a quantization coefficient of each color component by multiplying the correction coefficient of each color component by a standard quantization coefficient set in advance.

8. The image capturing apparatus according to claim 7, wherein an evening view mode for enhancing a red component and a day view mode for enhancing a blue component are included in the image capturing mode.

9. The image capturing apparatus according to claim 8, wherein the instructions, when executed by the one or more processors, further cause the image capturing apparatus to:

measure a current date and time, and determine the evening view mode and the day view mode based on the measured date and time.

10. A method of controlling an image capturing apparatus having an image sensor, comprising:

encoding by, from image data obtained from the image sensor, generating a plane of each of color components that configure the image data, and independently for each of the planes of the color components, performing frequency conversion processing, quantization processing, and encoding; and determining a quantization coefficient used in quantization processing in accordance with image capturing information of a time of capturing the image data, wherein the determining of the quantization coefficient includes:

deciding whether or not to correct a quantization coefficient that is used in quantization processing for a plane of each color component obtained by the image sensor based on an ISO sensitivity or exposure information for a time of capturing; and in a case when it is decided that a quantization coefficient will be corrected, determining, based on a distribution of a histogram of a plane of each color component, a quantization coefficient used in quantization processing for the respective color component.

11. A method of controlling an image capturing apparatus having an image sensor and a storage configured to store, in association, a type of image capturing mode and information for determining a quantization coefficient of each color component, the method comprising:

encoding by, from image data obtained from the image sensor, generating a plane of each of color components that configure the image data, and independently for each of the planes of the color components, performing frequency conversion processing, quantization processing, and encoding; and determining a quantization coefficient used in quantization processing in accordance with image capturing information of a time of capturing the image data, wherein the determining of the quantization coefficient includes:

determining, based on an image capturing mode at a time of capturing by the image sensor, a quantization coefficient used in quantization processing of every color component with reference to a predetermined storage, and generating the encoded data for each color component using the determined quantization coefficient of each color component.

12. A non-transitory computer readable storage medium storing a program which causes a computer to execute a method of controlling an image capturing apparatus having an image sensor, the method comprising:

encoding by, from image data obtained from the image sensor, generating a plane of each of color components that configure the image data, and independently for each of the planes of the color components, performing frequency conversion processing, quantization processing, and encoding; and determining a quantization coefficient used in quantization processing in accordance with image capturing information of a time of capturing the image data, wherein the determining of the quantization coefficient includes:

deciding whether or not to correct a quantization coefficient that is used in quantization processing for a plane of each color component obtained by the image sensor based on an ISO sensitivity or exposure information for a time of capturing, and in a case when it is decided that a quantization coefficient will be corrected, determining, based on a distribution of a histogram of a plane of each color component, a quantization coefficient used in quantization processing for the respective color component.

13. A non-transitory computer readable storage medium storing a program which causes a computer to execute a method of controlling an image capturing apparatus having an image sensor and a storage configured to store, in association, a type of image capturing mode and information for determining a quantization coefficient of each color component, the method comprising:

encoding by, from image data obtained from the image sensor, generating a plane of each of color components that configure the image data, and independently for each of the planes of the color components, performing frequency conversion processing, quantization processing, and encoding; and determining a quantization coefficient used in quantization processing in accordance with image capturing information of a time of capturing the image data, wherein the determining of the quantization coefficient includes:

determining, based on an image capturing mode at a time of capturing by the image sensor, a quantization coefficient used in quantization processing of every color component with reference to a predetermined storage, and generating the encoded data for each color component using the determined quantization coefficient of each color component.

\* \* \* \* \*